(12) United States Patent
Hurich

(10) Patent No.: US 7,774,777 B2
(45) Date of Patent: Aug. 10, 2010

(54) METHOD, REAL-TIME COMPUTATION DEVICE, AND INITIALIZATION PROGRAM FOR PARTIAL INITIALIZATION OF A COMPUTER PROGRAM EXECUTABLE ON THE COMPUTATION DEVICE

(75) Inventor: Martin Hurich, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 2161 days.

(21) Appl. No.: 10/459,316

(22) Filed: Jun. 10, 2003

(65) Prior Publication Data

US 2003/0233390 A1 Dec. 18, 2003

(30) Foreign Application Priority Data

Jun. 17, 2002 (DE) ................................. 102 28 064

(51) Int. Cl.
G06F 9/46 (2006.01)
G06F 19/00 (2006.01)
G06F 15/16 (2006.01)
G06F 15/173 (2006.01)
G05B 11/01 (2006.01)

(52) U.S. Cl. ........................ 718/100; 718/103; 718/104; 718/105; 701/58; 701/60; 701/66; 709/218; 709/225; 700/14; 700/19; 700/20

(58) Field of Classification Search .................... 718/1, 718/100, 101, 102, 103, 104, 105, 106, 107, 718/108; 701/58, 60, 61, 66; 700/9, 11, 700/14, 19, 20, 28; 709/201, 217, 218, 225
See application file for complete search history.

(56) References Cited

U.S. PATENT DOCUMENTS 5,497,492 A * 3/1996 Zbikowski et al. ............. 713/2
5,859,959 A * 1/1999 Kimball et al. ................ 714/4
6,208,930 B1 * 3/2001 Uematsu ..................... 701/110
6,249,848 B1 * 6/2001 Terada et al. ................ 711/154

(Continued)

FOREIGN PATENT DOCUMENTS

DE 4 037 143 5/1992

(Continued)

Primary Examiner—Meng-Ai An
Assistant Examiner—Abdullah Al Kawsar
(74) Attorney, Agent, or Firm—Kenyon & Kenyon LLP

(57) ABSTRACT

A method for partial initialization of a real-time computation device that is connected via a communication system to further computation devices. Various functionalities are implemented in the computation device by executing a computer program in different fixed time interval patterns. Communication to the further computation devices is performed in a fixed communication pattern. Time interval patterns that are slower than the communication pattern can be influenced from the computer program via the communication pattern. To allow the computation device to be partially initialized despite a large inventory of functionalities, without impairing communication to the further computation devices, for initialization of a portion of the computer program, the computation device is transferred into a meta-state by the communication pattern being maintained, halting all time interval patterns being initialized that are slower than the communication pattern, in a sequence from the slowest to the fastest time interval pattern to be initialized, all the time interval patterns to be initialized are successively initialized, and after initialization of all the time interval patterns to be initialized, the communication pattern is switched into an initialized state without impairing communication to the further computation devices.

16 Claims, 2 Drawing Sheets

U.S. PATENT DOCUMENTS

| | | | |
|---|---|---|---|
| 6,260,058 B1 * | 7/2001 | Hoenninger et al. | 718/107 |
| 6,751,535 B2 * | 6/2004 | Mori | 701/23 |
| 6,754,576 B2 * | 6/2004 | Nishimura | 701/102 |
| 6,889,128 B2 * | 5/2005 | DeBoni | 701/36 |
| 6,968,552 B2 * | 11/2005 | Nishimura | 718/107 |
| 7,386,853 B2 * | 6/2008 | Hanzawa | 718/108 |
| 7,484,208 B1 * | 1/2009 | Nelson | 718/1 |
| 2001/0047473 A1 * | 11/2001 | Fallon | 713/2 |
| 2003/0014467 A1 * | 1/2003 | Hanzawa | 709/102 |
| 2003/0159027 A1 * | 8/2003 | Sekiya et al. | 713/1 |

FOREIGN PATENT DOCUMENTS

| | | |
|---|---|---|
| DE | 4 203 704 | 8/1993 |
| DE | 199 00 957 | 1/1996 |

* cited by examiner

METHOD, REAL-TIME COMPUTATION DEVICE, AND INITIALIZATION PROGRAM FOR PARTIAL INITIALIZATION OF A COMPUTER PROGRAM EXECUTABLE ON THE COMPUTATION DEVICE

RELATED APPLICATION INFORMATION

This application claims priority to and the benefit of German Patent Application Number 10228064.9, which was filed in Germany on Jun. 17, 2002.

FIELD OF THE INVENTION

The present invention relates to a method for partial initialization of a real-time computation device that is connected via a communication system to further computation devices.

BACKGROUND INFORMATION

German Patent Application No. 195 00 957 refers to a method for controlling technical procedures or processes on the basis of a multitasking-capable real-time operating system. To implement control, a computer program is executed on a computation device, in particular on a microcomputer of a control device for a motor vehicle. The computer program is subdivided into several so-called tasks, each having different priorities assigned to them. This document proceeds from an existing art in which, in the context of execution of the computer program, higher-priority tasks can interrupt lower-priority tasks at any time (so-called preemptive scheduling or preemptive multitasking). In German Patent Application No. 195 00 957, the higher-priority tasks can interrupt the lower-priority tasks only at certain program points defined by a user upon creation of the computer program. The reader is referred expressly to that document regarding the configuration and manner of operation of a multitasking-capable real-time operating system.

It is understood that several computation devices may be disposed (provided) in a computation device network in which the computation devices are interconnected via at least one communication system. A computation device network is used, for example, in a motor vehicle. The use of a computation device network is also used, however, in rail vehicles or aircraft. The communication systems used may be bus systems over which information can be exchanged among the computation devices in accordance with a specific protocol, for example CAN (Controller Area Network), TTCAN (Time-Triggered CAN), or FlexRay.

When the computation devices are used in motor vehicles, the computation devices are embodied as control devices. The individual control devices have different purposes, and control components or functions in the vehicle in open- and/or closed-loop fashion. In the control devices, a computer program is executed in different fixed time interval patterns in order to perform their intended functions. Important or safety-critical computer programs (e.g. to control the fuel injection system of an internal combustion engine) may be executed in fast time interval patterns, whereas less-critical computer programs (e.g. for implementing lambda regulation of an exhaust emissions control system) can run in slower time interval patterns. The fast time interval patterns are also referred to as preemptive time interval patterns. They can interrupt other time interval patterns. The slower time interval patterns are also referred to as cooperative time interval patterns. The preemptive time interval patterns are imposed, i.e. started by hardware timers, whereas the cooperative time interval patterns are started not by timers but by software.

A computer program or specific portions thereof can be in a number of states. When the ignition is shut off, the control device is in a deactivated state in which no supply voltage is applied to the control device. Switching on the ignition causes supply voltage to be applied at least partially to the control device, and it transitions into an active state. Switching on the ignition should also initialize the computer program that is executable on the control device, so that it is ready for execution. In the simplest case, the entire computer program is initialized when the ignition is switched on, and is ready for execution.

As the function inventory of computer programs increases, however, it may happen that not the entire computer program, but only portions thereof are initialized. A partial initialization may be necessary, for example, for time reasons, since the time elapsing between actuation of the ignition and starting of the internal combustion engine must not be so long so that the time between actuation of the ignition and starting of the internal combustion engine is insufficient for initialization of the entire computer program. The initialization can, however, also be deliberately restricted to those portions of the computer program that are needed first. The portions of the computer program not initialized at first can then be partially initialized subsequently, either as required, or as soon as the time necessary therefor is available, or after a definable period of time has elapsed.

In partial initialization, either a further portion of the computer program or the entire remaining portion of the computer program is subsequently initialized. The entire computer program can therefore also be initialized in the context of several partial initializations performed in succession.

It is believed that a requirement for control devices in a control device network is maintenance of communication with the other control devices of the network via the communication system, since otherwise the execution of the computer programs, and therefore the open- and/or closed-loop control tasks of the control devices, are critically disrupted. The common protocols (e.g. CAN, TTCAN, FlexRay) each require a specific time-related behavior. The conversion process in the control device software uses a real-time operating system with fixed time interval patterns in order to represent that behavior. The time-related behavior is constructed on the fixed time interval patterns. Continuous communication requires that the fixed time interval patterns be maintained. As a consequence of the need for fixed time interval patterns in order to maintain communication, those time interval patterns must remain uninterruptedly active for the entire operating period of the control device in a partially initialized state, during subsequent partial initialization, and even after the completion of partial initialization.

Theoretically, a partial initialization would be achievable, for example, by transferring the various functions of the computer program that are subsequently to be initialized, in controlled fashion, from the uninitialized state into the initialized state, with the requirement that the transition must occur in each individual case in such a way that continuous communication is not impaired. Given the size of larger computer programs, with the several hundred functions, several thousand program modules, and several hundred thousand lines of program source code that are present e.g. in motor vehicle control devices, this kind of controlled transfer of each individual function into the initialized state is not achievable with acceptable outlay and within an acceptable period of time.

SUMMARY OF THE INVENTION

It is therefore an object of an exemplary embodiment and/or exemplary method of the present invention to create, in a computation device constituting part of a computation device network, a capability for secure and reliable subsequent partial initialization of even relatively voluminous computer programs executable on the computation device, without thereby impairing communication among the computation devices of the computation device network.

In an exemplary embodiment and/or exemplary method of the present invention, for initialization of a portion of the computer program, the computation device is transferred into a meta-state in which:
   the communication pattern is maintained;
   all time interval patterns to be initialized that are slower than the communication pattern are halted;
   in a sequence from the slowest to the fastest time interval pattern to be initialized, all the time interval patterns to be initialized are successively initialized; and
   after initialization of all the time interval patterns to be initialized, the communication pattern is switched into an initialized state without impairing communication to the further computation devices.

According to an exemplary embodiment and/or exemplary method of the present invention, the computation device is brought into a meta-state that lies between a partially initialized state and an initialized state. In the initialized state, the computer program can certainly encompass functions that are not yet initialized and that can then be subsequently initialized at a later point in time in the context of a further partial initialization. It is thus conceivable to apply the method according to the present invention several times in succession to different portions of the computer program, until ultimately all the portions are initialized.

One aspect of an exemplary embodiment and/or exemplary method of the present invention is the fact that in the meta-state, all of the portions of the computer program that are to be initialized, with the exception of the communication pattern, are simply shut off. This may be done without impairing communication among the computation devices because communication is accomplished via the communication pattern, and real-time operation is thereby maintained. Because the time interval pattern to be initialized is shut off, an initialization of that time interval pattern can be performed without coming into conflict with time interval patterns from the partially initialized state.

In the meta-state, all the time interval patterns to be initialized are initialized in succession, beginning from the slow to the fast time interval patterns. As soon as all the time interval patterns except for the communication pattern have been initialized, the actual change of state into the initialized state occurs. For that purpose, the communication pattern is initialized last, by simply switching it into the new initialized state. The communication pattern is switched over in such a way that communication among the computation devices is not impaired. This can be done, for example, by switching over task tables. All the time interval patterns are then once again enabled, and in the initialized state the slower time interval patterns can be influenced, i.e. started and terminated, from the computer program via the communication pattern.

Strictly speaking, it is the functionalities of the computer program that are initialized. But because a functionality is never executed alone, but instead constitutes a time interval pattern together with other functionalities, it appears from the viewpoint of the operating system as if the time interval patterns were initialized. In fact, however, it was individual functional blocks within the time interval pattern, while other blocks within the same time interval pattern can be transferred unchanged from the partially initialized into the initialized state. But because a time interval pattern always represents the sum of the functionalities contained in it, the result is thus accordingly that with each arbitrary functional part within a time interval pattern, the time interval pattern containing it is also initialized. The time interval pattern represents, so to speak, a kind of super-functionality. What is referred to herein is therefore (partial) initialization of the time interval pattern and not of the functionalities.

According to an exemplary embodiment and/or exemplary method of the present invention, the time interval patterns may be initialized are initialized aperiodically during the meta-state. Because the time interval patterns to be initialized are shut off, an aperiodic initialization of those time interval patterns can be performed without coming into conflict with time interval patterns from the partially initialized state. Communication among the computation devices is not impaired by the aperiodic initialization because communication is accomplished via the communication pattern, and real-time operation is thus maintained. This development takes into account the fact that initialization of the individual time interval patterns in some cases requires different lengths of time.

According to an exemplary embodiment and/or exemplary method of the present invention, in the meta-state, a first task for initialization of at least the slowest time interval pattern may be initialized be called by the communication pattern. According to this embodiment, initialization of the time interval patterns to be initialized is therefore effected not directly from the communication pattern but rather indirectly via at least one task.

Advantageously, each time interval pattern to be initialized is initialized by a separate task, a further task for initialization of the next time interval pattern being called, in the specified sequence, from each executed task until all the time interval patterns to be initialized are initialized.

Proceeding from the real-time computation device of the kind cited above, that the computation device includes an apparatus, arrangement or structure for initializing a portion of the computer program which bring the computation device, for partial initialization, into a meta-state, the apparatus, arrangement or structure for partial initialization encompassing:
   an apparatus, arrangement or structure for maintaining the communication pattern;
   an apparatus, arrangement or structure for halting all time interval patterns to be initialized that are slower than the communication pattern;
   an apparatus, arrangement or structure for successively initializing all time interval patterns to be initialized, in a sequence from the slowest to the fastest time interval patterns to be initialized; and
   an apparatus, arrangement or structure for switching the communication pattern into an initialized state after initialization of all the time interval patterns to be initialized, without impairing communication to the further computation devices.

According to an exemplary embodiment and/or exemplary method of the present invention, the computation device includes an apparatus, arrangement or structure for performing the method according to the present invention.

According to an exemplary embodiment and/or exemplary method of the present invention, the apparatus, arrangement or structure for initializing a portion of the computer program may be implemented as an initialization program. The initialization program may be stored on a memory element, in particular on a read-only memory, a random-access memory, or a flash memory. The initialization program may be triggered by a specific triggering event, e.g. the actuation of terminal 15 (actuation of the ignition in a motor vehicle), or the calling of a specific functionality of the computer program that has not yet been initialized. The initialization program first halts all time interval patterns that are to be initialized, with the exception of the communication pattern. A first initialization task is then called by the communication pattern. This task begins partial initialization, and initializes the slowest time interval pattern that is to be initialized. After completion of the first task, a second task is called; this continues the partial initialization and initializes the second-slowest time interval pattern. After completion of the second task, further tasks are successively called in order to initialize the remaining time interval patterns in the specified sequence, until the fastest time interval pattern to be initialized—which is nevertheless slower than the communication pattern—has been initialized. The initialization program then ensures that the communication pattern is the last to be switched over from the partially initialized state into the initialized state, without impairing or interrupting real-time communication.

According to an exemplary embodiment of the present invention, the computation device may be embodied as a control device for a motor vehicle for controlling specific motor vehicle functions on an open- and/or closed-loop basis. The exemplary method according to the present invention may provide enormous advantages in motor vehicle control devices in particular, because of the large number of functionalities of the computer programs used therein. The exemplary method according to the present invention may provide, essentially or perhaps for the first time, secure and reliable partial initialization of a computer program having a large inventory of functions, such as is used in a motor vehicle control device.

The implementation of the exemplary method according to the present invention in the form of an initialization program that is executable on a computation device, in particular on a microprocessor of a control device for a motor vehicle, is particularly significant. The initialization program is provided for initialization of a portion of a computer program that is also executable on the computation device. The initialization program is suitable for carrying out the exemplary method according to the present invention when it executes on the computation device. In this case, therefore, the invention is implemented by way of an initialization program, so that this program constitutes the invention in the same way as the method for whose implementation the program is suitable.

According to an exemplary embodiment and/or exemplary method of the present invention, the initialization program may be stored on a memory element. An electrical storage medium, for example a read-only memory, a random-access memory, or a flash memory, can be used, in particular, as the memory element.

Thus, an exemplary embodiment and/or exemplary method of the present invention relates to a method for partial initialization of a real-time computation device that is connected via a communication system to further computation devices. In the computation device, various functionalities are implemented by execution of a computer program in different fixed time interval patterns. Communication to the further computation devices is performed in a fixed communication pattern. Time interval patterns that are slower than the communication pattern can be influenced, in particular started and terminated, from the computer program via the communication pattern.

An exemplary embodiment and/or exemplary method of the present invention further relates a real-time computation device that is connected via a communication system to further computation devices. In the computation device, various functionalities can be implemented by executing a computer program in different fixed time interval patterns. The computation device communicates with the further computation devices in a fixed communication pattern. Time interval patterns that are slower than the communication pattern can be influenced from the computer program via the communication pattern.

An exemplary embodiment and/or exemplary method of the present invention also relates an initialization program executable on a computation device, in particular on a microprocessor of a control device for a motor vehicle, for initializing a portion of a computer program that is also executable on the computation device.

DETAILED DESCRIPTION

Figure 2:
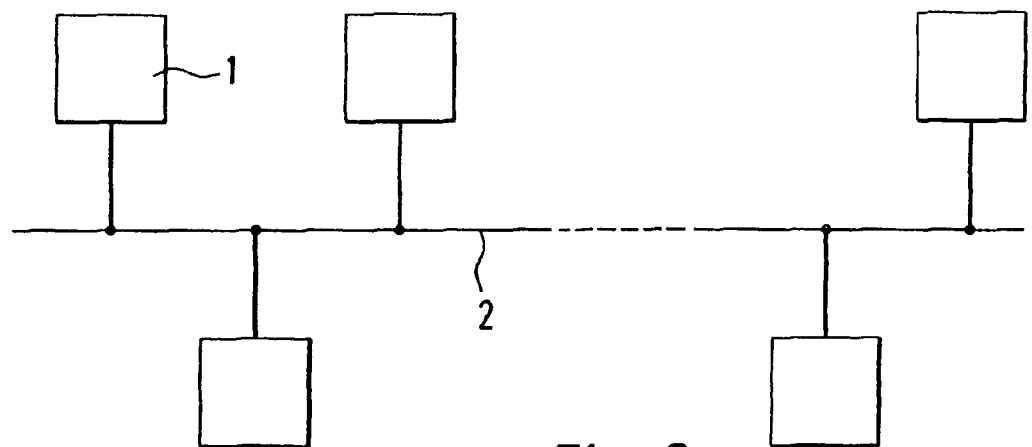
FIG. 2 shows a computation device network encompassing several real-time computation devices that are connected to one another via a communication system.

An exemplary embodiment and/or exemplary method of the present invention is based on a plurality of real-time computation devices 1 that are interconnected via a communication system 2 (see FIG. 2). A computation device network of this kind is used, for example, in a motor vehicle, computation devices 1 then being embodied as control devices. The individual control devices 1 have different purposes, and control certain components and/or functions in the motor vehicle on an open- and/or closed-loop basis. By way of communication system 2, control devices 1 can exchange data with one another in accordance with the CAN (Controller Area Network) protocol or any other protocol.

Figure 1:
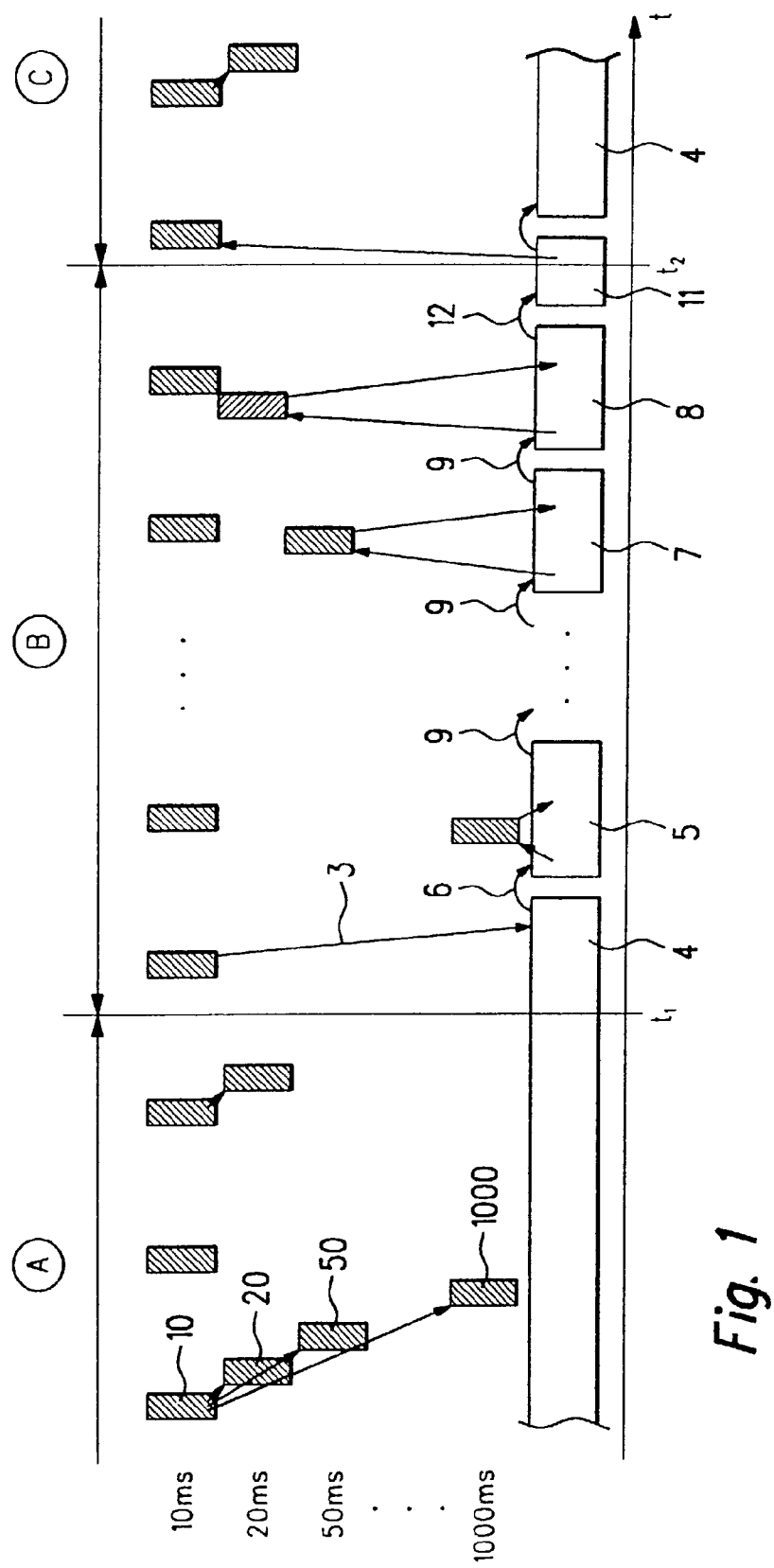
FIG. 1 shows an execution diagram of an exemplary method according to the present invention for partial initialization of a real-time computation device.

In control devices 1, in order for their open- and/or closed-loop control functions to be performed as intended, computer programs are executed in different fixed time interval patterns having a repetition frequency of 10 ms, 20 ms, 50 ms, . . . , 1000 ms (see FIG. 1). Important or safety-critical functions, e.g. for controlling the fuel injection system of an internal combustion engine of a motor vehicle, may be executed in fast time interval patterns (e.g. 10 ms). Less-critical functions, on the other hand, e.g. for implementing a lambda control system of an exhaust emissions control system of a motor vehicle, can proceed in slower time interval patterns (e.g. 1000 ms). The fast time interval patterns are also referred to as preemptive time interval patterns. They can interrupt other time interval patterns. The slower time interval patterns are also referred to as cooperative time interval patterns. The preemptive time interval patterns are imposed, i.e. started by hardware timers, whereas the cooperative time interval patterns are started not by timers but by software.

A computer program or specific portions thereof, called tasks, can be in different states A and C (see FIG. 1). State A corresponds, for example, to a partially initialized state in which selected control devices 1 are switched into a power-saving mode and selected control device functions are partially initialized. The partially initialized state A can, for example, be triggered by the fact that in the context of a so-called "keyless go" system, an authorized person approaches the parked motor vehicle. The person's authorization is detected in non-contact fashion by the motor vehicle, for example by way of a correspondingly coded card that the person is carrying. It is also conceivable, however, for a control device 1 to change into the partially initialized state A as soon as, in a deactivated state, specific components (e.g. the car radio) in the motor vehicle are actuated. Partial initialization of selected control devices 1 in the motor vehicle allows a subsequent starting operation (actuation of ignition, terminal 15) to be made much shorter.

State C corresponds to normal operation of a control device 1, in which the computer program executing on control device 1 is completely initialized and the complete functionality of control device 1 is available. It is also entirely conceivable, however, that although more time interval patterns are initialized in state C than in state A, not all the time interval patterns 10, 20, 50, . . . 1000 are yet initialized. In this case the exemplary method according to the present invention for partial initialization could be cycled through again once or several times until ultimately a complete initialization of control device 1 is achieved. The exemplary method according to the present invention for partial initialization can therefore be performed sequentially several times in succession, additional time interval patterns 10, 20, 50, . . . 1000 being initialized at each execution.

In order to start the motor vehicle from state A, firstly the ignition (terminal 15) is actuated. Control device or devices 1 of the motor vehicle must be transferred into normal operation (state C) before starting. This requires that control devices 1 which are not yet initialized in state A, but are required for execution of the starting procedure, be subsequently initialized. The exemplary method according to the present invention provides subsequent initialization of specific control devices or control device functions by transferring into normal operation the time interval patterns necessary therefor.

The exemplary method according to the present invention will be explained in further detail below with reference to FIG. 1. To begin with, control device 1 is in the partially initialized state A ($t<t_1$). In state A, the ignition (terminal 15) has not yet been activated, and important supply voltages are still absent. In time interval patterns 10, 20, 50, . . . 1000, only the functionalities necessary for state A are configured. This does not correspond to the complete inventory of functions for normal operation C. Only selected computer cores of computation devices 1, and the computer program portions necessary for the configuration of communication system 2, are initialized. All other parts of the computer program are not yet initialized. Several time interval patterns 10, 20, 50, . . . 1000, which belong to state A and are therefore all identically shaded, are running. Time interval patterns 10, 20, 50, . . . 1000 are called periodically; this is apparent from the fact that they are executed repeatedly beginning at the left. Time interval patterns 10, 20, 50, . . . 1000 depicted in FIG. 1 have operating system priorities that increase from bottom to top.

Control device 1 participates in the computer network and uses the 10-ms time interval pattern 10 as the communication pattern. The communication pattern must not exhibit excessive timing fluctuations ("jittering") or indeed interruptions.

By way of a communication controller (e.g. CAN bus), at time $t_1$ control device 1 receives from a central gateway module of the computer network, via communication system 2, a message that the ignition has been activated, i.e. a terminal status change (KL15 via CAN). This causes the following actions to occur in control device 1:
  a) Main relay of the motor vehicle is closed so that supply voltages are present throughout control device 1;
  b) Hardware and software of control device 1 that are not yet initialized are subsequently initialized;
  c) Operation is switched as quickly as possible into normal state C; and
  d) Communication continues to occur without change via communication system 2, using communication pattern 10.

In order to meet these requirements, control device 1 or the initialization program executed on control device 1 performs the following steps for partial initialization:

Control device 1 is switched out of the partially initialized state A into a meta-state B. In meta-state B, all hardware and software portions of control device 1 that are not yet initialized are initialized, in order to switch as quickly as possible into normal state C. At the same time, communication is maintained without change in meta-state B.

Firstly, all time interval patterns 20, 50, . . . 1000 that are to be initialized, with the exception of communication pattern 10, are halted. This can be accomplished, for example, by the fact that they are no longer called by communication pattern 10, as was the case in partially initialized state A (see arrows from communication pattern 10 to time interval patterns 20, 50, . . . 1000, symbolizing the calling of said time interval patterns 20, 50, . . . 1000). In meta-state B, only communication pattern 10 of partially initialized state A continues to be periodically executed (see shading of communication pattern 10 in meta-state B, which corresponds to the shading in partially initialized state A). During meta-state B, therefore, time interval patterns foreign to partially initialized state A, which belong for example to normal operation C, can be called aperiodically without thereby coming into conflict with time interval patterns of partially initialized state A.

At the same time, a message (see arrow 3) goes via communication pattern 10 to a background task 4, having a lower operating system priority, to close the main relay, wait for stable voltage conditions in control device 1, and successively initialize all the time interval patterns 20, 50, . . . 1000 of normal operation C, in the sequence from slow to fast time interval patterns. For that purpose, an initialization task 5 is called from background task 4 (see arrow 6) and initializes the slowest time interval pattern 1000. Once time interval pattern 1000 has been initialized, further initialization tasks 7, 8 are called from initialization task 5 (see arrows 9), and initialize the faster time interval patterns 20, 50. During meta-state B, therefore, time interval patterns 20, 50, . . . 1000 having the complete functionality of normal operation C are successively executed, i.e. are transferred into normal state C. The change from partially initialized state A into normal state C is apparent from the different shading of the initialized time interval patterns 10, 20, 50, . . . 1000. Normal state C is thus initialized, while communication pattern 10 of partially initialized state A continues to maintain real-time operation.

After complete initialization of time interval patterns 20, 50, . . . 1000 all the way to the 20-ms time interval pattern 20, a further background task 11 is called (see arrow 12), from which the actual state change in control device 1 is performed at time $t_2$. Communication pattern 10 is switched into the new mode C by, for example, replacing task tables for partially initialized state A with task tables for normal state C. All time interval patterns 20, 50, . . . 1000 are then once again enabled. As a result, communication pattern 10 of partially initialized state A is replaced by communication pattern 10 of normal state C, and the slower time interval patterns 20, 50, . . . 1000 can once again, in normal state C, be called from communication pattern 10. In addition, the higher-priority, faster time interval patterns (not depicted) can be restarted.

The entire system is now running in normal state C, as if the partially initialized state A with incomplete voltage supply, and meta-state B with initialization, had never existed. Real-time communication operation has nevertheless continuously been maintained throughout the partial initialization phase, as is evident from the equidistant spacing of communication pattern 10 during meta-state B.

Figure 3:
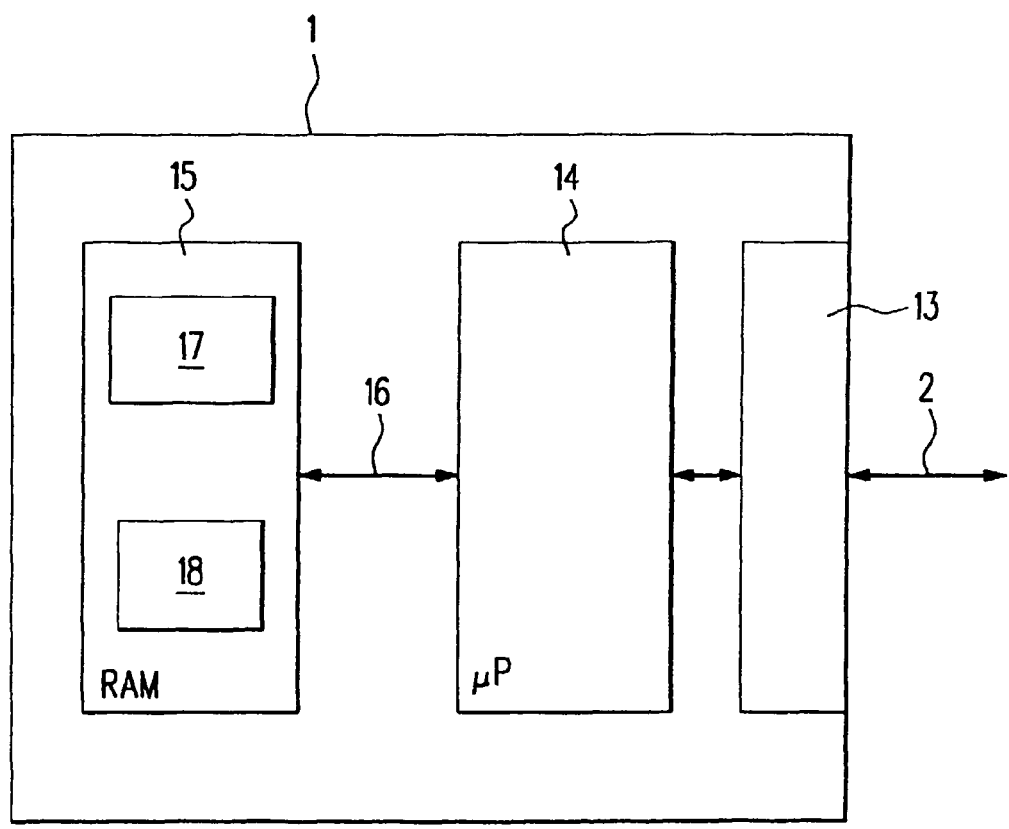
FIG. 3 shows a real-time computation device according to the present invention for partial initialization of a computer program executable on the computation device.

FIG. 3 depicts a real-time computation device 1 that can be partially initialized in accordance with the exemplary method according to the present invention. Computation device 1 may be embodied as a motor vehicle control device. Control device 1 is connected to communication system 2 via a communication controller 13, which is embodied e.g. as a CAN bus interface. A microprocessor 14, which is suitable for execution of a computer program 18, is provided in control device 1.

Execution of computer program 18 on microprocessor 14 allows control device 1 to perform its intended open- and/or closed-loop control function. Execution of computer program 18 furthermore results in coordination of the communication of control device 1 with other control devices 1 of the computer network via communication system 2.

Computer program 18 is stored on a memory element 15 that may be embodied as an electrical storage medium, for example as a read-only memory, a random-access memory, or a flash memory. For the execution of computer program 18 in microprocessor 14, it is transferred, either in its entirety or on a command basis, to microprocessor 14 via a data connection 16. The results of calculations that are performed by microprocessor 14, or data that have been received from other control devices 1 via communication system 2 and communication controller 13, can be stored via data connection 16 in memory element 15.

Also stored in memory element 15 in addition to computer program 18 is an initialization program 17 that is called at time $t_1$, (see FIG. 1) and is transferred via data connection 16 to microprocessor 14 for execution. Initialization program 17 is suitable for carrying out the exemplary method according to the present invention when it runs on microprocessor 14.

What is claimed is:

1. A method for partially initializing a real-time computation device, the method comprising:
    transferring the real-time computation device into a meta-state, by performing the following:
        maintaining a fixed communication pattern;
        halting all time interval patterns to be initialized that are slower than the fixed communication pattern;
        successively initializing all of the time interval patterns to be initialized, in a sequence from a slowest one to a fastest one; and
        switching, after initializing all of the time interval patterns to be initialized, the fixed communication pattern into an initialized state without impairing communication to further computation devices;
    wherein:
        the real-time computation device is connected via a communication system to the further computation devices, various functionalities being implemented in the real-time computation device by executing the computer program in different fixed time interval patterns and the communication to the further computation devices being performed in the fixed communication pattern, the time interval patterns that are slower than the fixed communication pattern being started and terminated by the computer program via the fixed communication pattern; and
        the time interval patterns to be initialized are initialized aperiodically during the meta-state.

2. The method of claim 1, wherein in the meta-state, a first task for initializing at least the slowest one of the time interval patterns to be initialized is called by the fixed communication pattern.

3. The method of claim 2, wherein each of the time interval patterns to be initialized is initializable by a separate task, a further task for initializing a next one of the time interval patterns being callable, in a specified sequence, from each executed task until all the time interval patterns to be initialized are initialized.

4. The method of claim 1, wherein the successively initializing is done for all of the time interval patterns that are slower than the fixed communication pattern.

5. A real-time computation device, comprising:
    an initializing arrangement for providing partial initialization, including a transferring arrangement to transfer the real-time computation device into a meta-state, the transferring arrangement including:
        a maintaining arrangement to maintain a fixed communication pattern in the meta-state;
        a halting arrangement to halt all time interval patterns to be initialized that are slower than the fixed communication pattern;
        a time interval pattern initializing arrangement to successively initialize all of the time interval patterns to be initialized, in a sequence from a slowest one to a fastest one; and
        a switching arrangement to switch, after initializing all of the time interval patterns to be initialized, the fixed communication pattern into an initialized state without impairing communication to further computation devices;
    wherein:
        the real-time computation device is connected via a communication system to further computation devices, various functionalities being implementable in the real-time computation device by executing a computer program in different fixed time interval patterns, the real-time computation device communicating in a fixed communication pattern with the further computation devices, and the time interval patterns that are slower than the fixed communication pattern being started and terminated by the computer program via the fixed communication pattern; and
        the time interval patterns to be initialized are initialized aperiodically during the meta-state.

6. The real-time computation device of claim 5, wherein in the meta-state, a first task for initializing at least the slowest one of the time interval patterns to be initialized is called by the fixed communication pattern.

7. The real-time computation device of claim 6, wherein each of the time interval patterns to be initialized is initializable by a separate task, a further task for initializing a next one of the time interval patterns being callable, in a specified sequence, from each executed task until all the time interval patterns to be initialized are initialized.

8. The real-time computation device of claim 5, wherein the initializing arrangement to initialize a portion of the computer program is an initialization program.

9. The real-time computation device of claim 5, wherein the real-time computation device includes a control device for a motor vehicle for controlling specific motor vehicle functions using at least one of an open-loop control and a closed-loop control.

10. The computation device of claim 5, wherein the successive initializing arrangement is configured to successively initialize all of the time interval patterns that are slower than the fixed communication pattern.

11. A computer storage medium storing an initialization computer program which is executable by a computation device, comprising:
   a computer code arrangement having computer code for performing the following:
   initializing a portion of a computer program, which is executable by the computation device, by transferring the computation device into a meta-state, by performing the following:
      maintaining a fixed communication pattern;
      halting all time interval patterns to be initialized that are slower than the fixed communication pattern;
      successively initializing all of the time interval patterns to be initialized, in a sequence from a slowest one to a fastest one; and
      switching, after initializing all of the time interval patterns to be initialized, the fixed communication pattern into an initialized state without impairing communication to further computation devices;
   wherein:
      the computation device is connected via a communication system to the further computation devices, various functionalities being implemented in the computation device by executing the computer program in different fixed time interval patterns and the communication to the further computation devices being performed in the fixed communication pattern, the time interval patterns that are slower than the fixed communication pattern being started and terminated by the computer program via the fixed communication pattern; and
      the time interval patterns to be initialized are initialized aperiodically during the meta-state.

12. The computer medium of claim 11, wherein in the meta-state, a first task for initializing at least the slowest one of the time interval patterns to be initialized is called by the fixed communication pattern.

13. The computer medium of claim 12, wherein each of the time interval patterns to be initialized is initializable by a separate task, a further task for initializing a next one of the time interval patterns being callable, in a specified sequence, from each executed task until all the time interval patterns to be initialized are initialized.

14. The computer medium of claim 11, wherein the computation device includes a microprocessor of a control device for a motor vehicle.

15. The computer medium of claim 11, wherein the computer medium includes at least one of a memory arrangement, a read-only memory, a random-access memory, and a flash memory.

16. The computer medium of claim 11, wherein the successively initializing is done for all of the time interval patterns that are slower than the fixed communication pattern.

* * * * *